United States Patent
Nishioka et al.

(10) Patent No.: US 9,906,637 B2
(45) Date of Patent: Feb. 27, 2018

(54) WIRELESS TERMINAL DEVICE

(71) Applicant: KYOCERA CORPORATION, Kyoto-shi, Kyoto (JP)

(72) Inventors: Ryoki Nishioka, Yokohama (JP); Kentaro Aoki, Higashiosaka (JP)

(73) Assignee: KYOCERA CORPORATION, Kyoto (JP)

( * ) Notice: Subject to any disclaimer, the term of this patent is extended or adjusted under 35 U.S.C. 154(b) by 71 days.

(21) Appl. No.: 14/655,711

(22) PCT Filed: Dec. 26, 2013

(86) PCT No.: PCT/JP2013/084827
§ 371 (c)(1),
(2) Date: Jun. 25, 2015

(87) PCT Pub. No.: WO2014/104173
PCT Pub. Date: Jul. 3, 2014

(65) Prior Publication Data
US 2015/0350401 A1    Dec. 3, 2015

(30) Foreign Application Priority Data
Dec. 27, 2012 (JP) .................. 2012-285584

(51) Int. Cl.
*H04Q 7/10* (2006.01)
*H04M 1/725* (2006.01)
(Continued)

(52) U.S. Cl.
CPC ......... *H04M 1/72513* (2013.01); *H04M 3/42* (2013.01); *H04W 4/008* (2013.01); *H04W 88/06* (2013.01)

(58) Field of Classification Search
CPC ........ H04B 1/005; H04B 1/406; H04B 7/024; H04B 1/0064; H04M 1/6041
See application file for complete search history.

(56) References Cited

U.S. PATENT DOCUMENTS 7,899,490 B2 * 3/2011 Park .................. H04W 88/06
                                                                      455/421
2005/0280597 A1 * 12/2005 Lee .................. H04B 1/0458
                                                                      343/853
(Continued)

FOREIGN PATENT DOCUMENTS

JP        6-232805 A    8/1994
JP        2003-134569 A    5/2003
(Continued)

OTHER PUBLICATIONS

International Search Report dated Apr. 1, 2014, corresponding to International application No. PCT/JP2013/084827.
(Continued)

*Primary Examiner* — Dai A Phuong
*Assistant Examiner* — Julio Perez
(74) *Attorney, Agent, or Firm* — Hauptman Ham, LLP

(57) ABSTRACT

A smartphone includes: a first antenna for performing wireless communication in accordance with a first communication scheme; a second antenna for performing wireless communication in accordance with a second communication scheme; a first RF circuit module for converting a signal, received by the first antenna, into a digital audio signal; an audio processing module for converting the digital audio signal into an analog audio signal; a second RF circuit module for converting a signal, received by the second antenna, into an analog audio signal; a receiver for outputting an analog audio signal; and a first switch for switching between: a first mode for transmitting an analog audio signal between the audio processing module and the receiver; and a second mode for transmitting an analog audio signal between the second RF circuit module and the receiver.

11 Claims, 8 Drawing Sheets

(51) Int. Cl.
*H04W 4/00* (2018.01)
*H04M 3/42* (2006.01)
*H04W 88/06* (2009.01)

(56) References Cited

U.S. PATENT DOCUMENTS

| | | |
|---|---|---|
| 2006/0102713 A1 | 5/2006 | Chiang et al. |
| 2008/0084854 A1* | 4/2008 | Feder ................ H04N 21/4122 370/338 |
| 2008/0165160 A1 | 7/2008 | Kocienda et al. |
| 2008/0186240 A1* | 8/2008 | Man .................... H01Q 1/2291 343/702 |
| 2009/0312050 A1* | 12/2009 | Tang ................... H04B 1/0064 455/553.1 |
| 2010/0227639 A1* | 9/2010 | Kim ..................... H04B 1/005 455/525 |
| 2011/0053636 A1* | 3/2011 | Park ................... H04M 1/6041 455/550.1 |
| 2011/0299697 A1 | 12/2011 | Sawai |

FOREIGN PATENT DOCUMENTS

| | | |
|---|---|---|
| JP | 2003-283599 A | 10/2003 |
| JP | 2007-67498 A | 3/2007 |
| JP | 2011-259409 A | 12/2011 |
| JP | 2012-504374 A | 2/2012 |
| WO | 2008/086302 A1 | 7/2008 |
| WO | 2010/037013 A2 | 4/2010 |

OTHER PUBLICATIONS

Office Action in JP Application No. 2014-554535, dated Apr. 26, 2016, for which an explanation of relevance is attached.
Office Action in JP Application No. 2014-554535, dated Nov. 22, 2016, for which an explanation of relevance is attached.

* cited by examiner

WIRELESS TERMINAL DEVICE

RELATED APPLICATIONS

The present application is a National Phase of International Application Number PCT/JP2013/084827, filed Dec. 26, 2013, which claims priority to Japanese application Number 2012-285584, filed Dec. 27, 2012.

TECHNICAL FIELD

The present disclosure relates to a wireless terminal device.

BACKGROUND ART

Wireless terminal devices having a touchscreen display are known. Wireless terminal devices having a touchscreen display include, for example, a smartphone and a tablet device. A wireless terminal device having a touchscreen display detects a finger or stylus pen gesture via the touchscreen display. A wireless terminal device having a touchscreen display operates in accordance with a detected gesture. Examples of operations in accordance with a detected gesture are disclosed in, for example, Patent Document 1.

Basic operations of a wireless terminal device having a touchscreen display are implemented by an OS (Operating System) installed in the wireless terminal device, such as Android, Black Berry OS, Symbian OS, iOS, and Windows Phone.

Patent Document 1: PCT International Publication, No. WO 2008/086302

DISCLOSURE OF THE INVENTION

Problems to be Solved by the Invention

Such wireless terminal devices, however, are equipped with only one communication module for a communication scheme handling voice calls.

In order to equip such a wireless terminal device with a voice call function for a new communication scheme, a processing module corresponding to this new voice call function is required. Furthermore, in a case in which a scheme of a newly supported digital audio signal differs from an existing communication scheme, the existing hardware and software configurations have to be drastically modified to provide a data processing module and a transmission path for the audio signal corresponding to each scheme.

An object of the present disclosure is to provide a wireless terminal device, which can make telephone calls using respective communication modules of a plurality of communication schemes conforming to voice calls, without drastically modifying existing hardware and software configurations.

Means for Solving the Problems

A wireless terminal device according to the present disclosure includes: a first communication module for performing wireless communication in accordance with a first communication scheme; a second communication module for performing wireless communication in accordance with a second communication scheme different from the first communication scheme; a first communication processing module for converting a signal, received by the first communication module, into a digital audio signal; an audio processing module for converting the digital audio signal, converted by the first communication processing module, into an analog audio signal; a second communication processing module for converting a signal, received by the second communication module, into an analog audio signal; an audio output module for outputting an analog audio signal; and a first switching module for switching between: a first mode for transmitting an analog audio signal between the audio processing module and the audio output module; and a second mode for transmitting an analog audio signal between the second communication processing module and the audio output module.

The second communication processing module may cause the first switching module to switch to the second mode when audio communication is performed by the second communication processing module, and to switch from the second mode to the first mode when audio communication by the second communication processing module is terminated.

The wireless terminal device according to the present disclosure may include a first control module for controlling incoming and outgoing calls in the first communication processing module and the second communication processing module; and the first control module may cause the second communication processing module to switch a mode of the first switching module in response to a request to start or terminate an incoming or outgoing voice call.

When there is a request for audio communication by the second communication processing module, in a case in which audio communication is not being performed by the first communication processing module, the first control module may switch to the second mode.

When there is a request for audio communication by the second communication processing module, in a case in which audio communication is being performed by the first communication processing module, the first control module may suspend the audio communication by the first communication processing module, and may switch from the first mode to the second mode.

When there is a request for audio communication by the second communication processing module, the first control module may switch to the second mode, in response to an instruction input through a user operation.

The second communication processing module may execute audio quality improvement processing on an audio signal, input from the second communication module, and may subsequently convert the audio signal into an analog audio signal.

The wireless terminal device may include a signal processing module for executing the audio quality improvement processing, separate from the second communication processing module.

The wireless terminal device may include a second control module for controlling presence or absence of the audio quality improvement processing by the signal processing module, and for transmitting a digital audio signal between the second communication processing module and the signal processing module.

The wireless terminal device may include: a short-range wireless communication module for performing wireless communication with an I/O device for inputting and outputting an audio signal; and a second switching module, wherein, when audio communication is performed by the first communication processing module, the second switching module transmits a digital audio signal between the short-range wireless communication module and the first communication processing module; and when audio communication is performed by the second communication processing module, the second switching module transmits a digital audio signal between the short-range wireless communication module and the second communication processing module.

The wireless terminal device according to the present disclosure includes: a first communication module for performing wireless communication in accordance with a first communication scheme; a second communication module for performing wireless communication in accordance with a second communication scheme different from the first communication scheme; an audio input module for inputting an analog audio signal; an audio processing module for converting the analog audio signal, input by the audio input module, into a digital audio signal; a first communication processing module for converting the digital audio signal, converted by the audio processing module, into a signal to be transmitted by the first communication module; a second communication processing module for converting the analog audio signal, input by the audio input module, into a signal to be transmitted by the second communication module; and a first switching module for switching between: a first mode for transmitting an analog audio signal between the audio processing module and the audio input module; and a second mode for transmitting an analog audio signal between the second communication processing module and the audio input module.

Effects of the Invention

According to the present disclosure, a wireless terminal device can make a telephone call by using respective communication modules of a plurality of communication schemes conforming to voice calls, without drastically modifying existing hardware and software configurations.

PREFERRED MODE FOR CARRYING OUT THE INVENTION

First Embodiment

A first embodiment of the present disclosure is described in detail with reference to the drawings. Hereinafter, a smartphone will be described as an example of a wireless terminal device.

Figure 1:
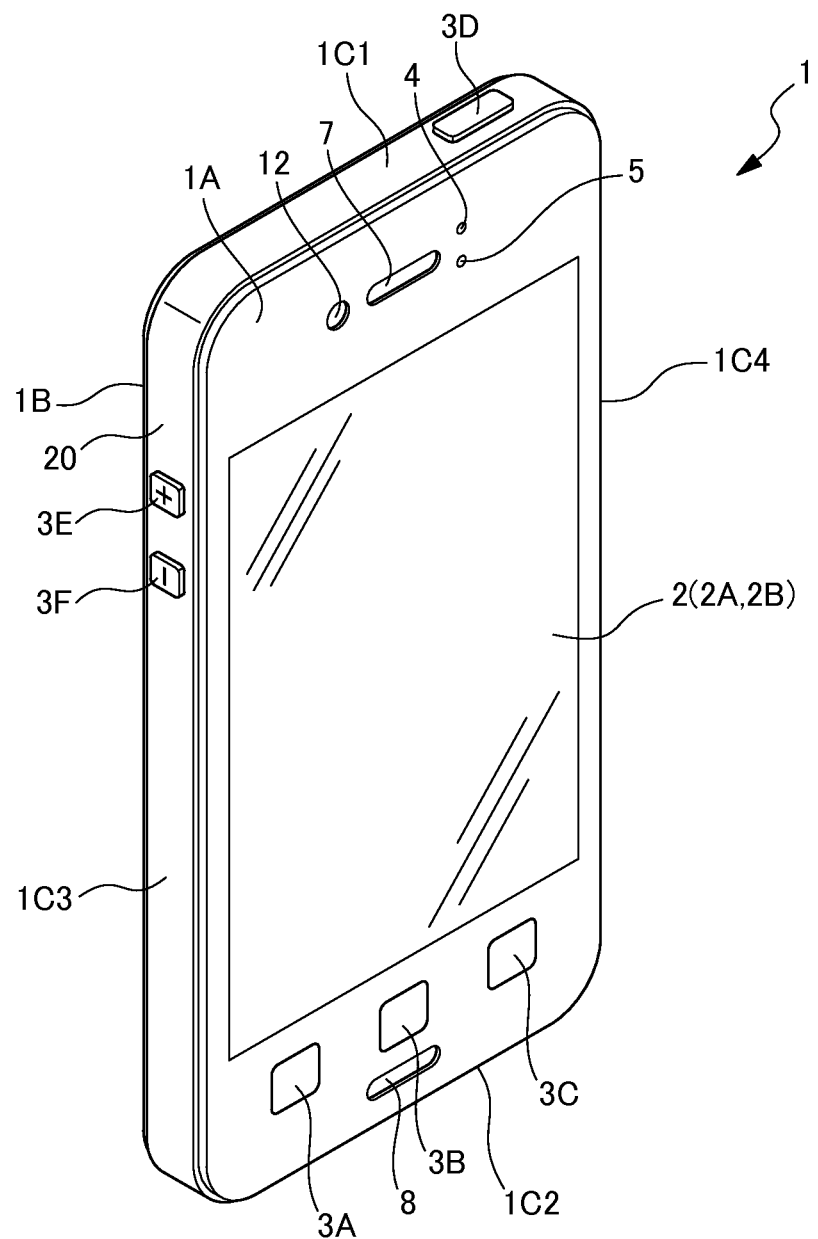
FIG. 1 is a perspective view showing an external appearance of a smartphone according to a first embodiment.
Figure 2:
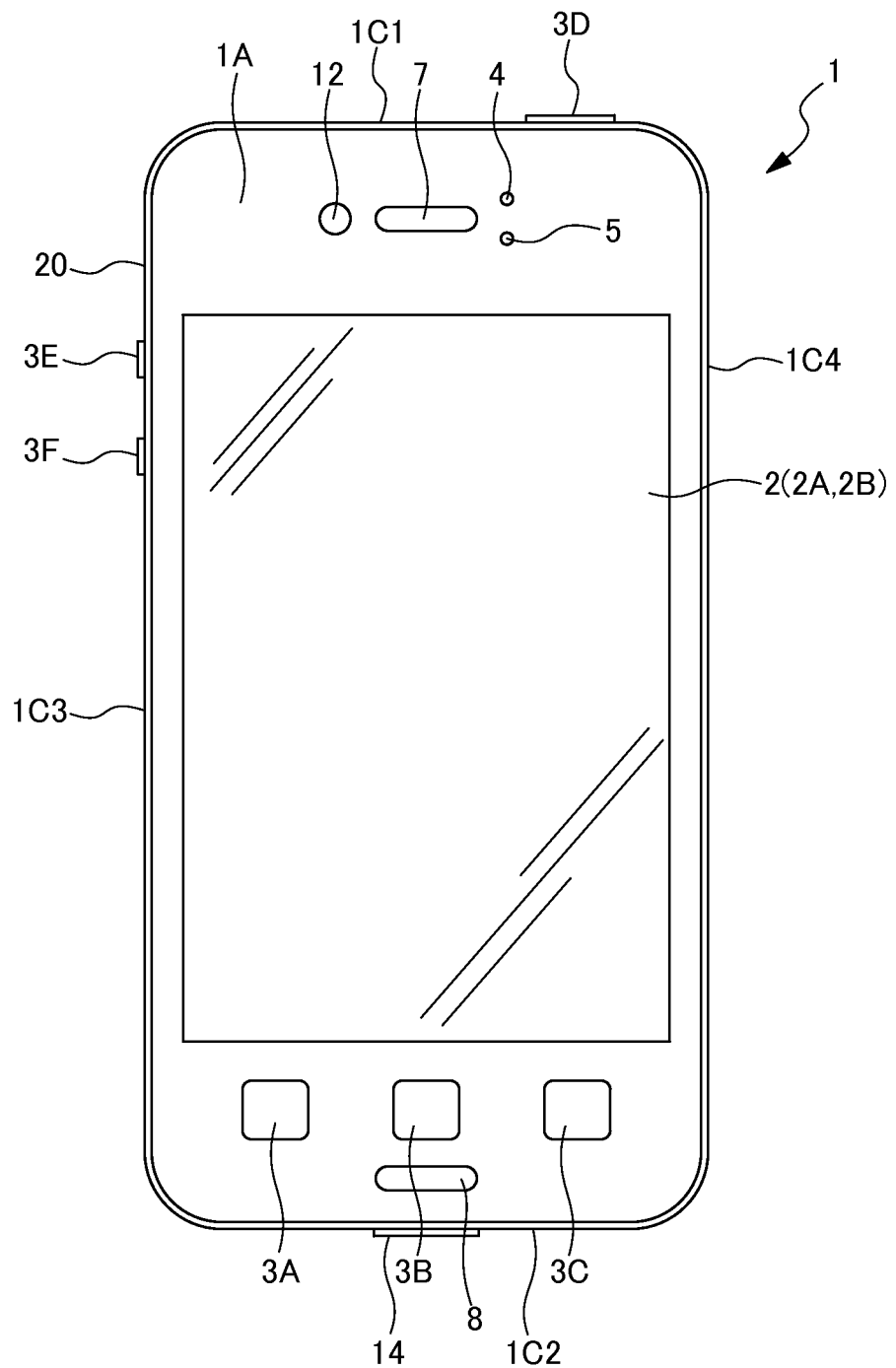
FIG. 2 is a front view showing the external appearance of the smartphone according to the first embodiment.
Figure 3:
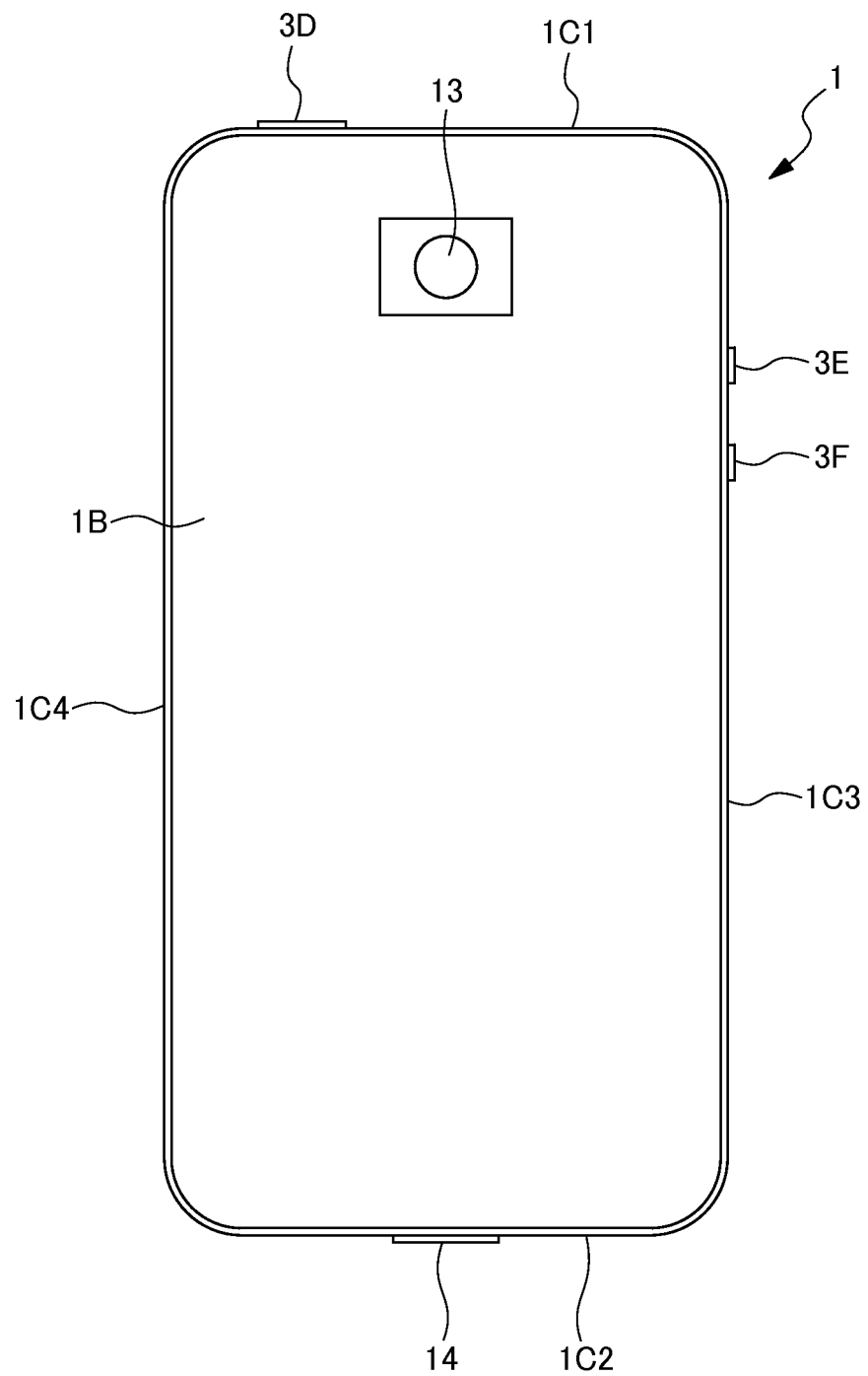
FIG. 3 is a rear view showing the external appearance of the smartphone according to the first embodiment.

An external appearance of a smartphone 1 according to one of some embodiments is described with reference to FIGS. 1 to 3. As shown in FIGS. 1 to 3, the smartphone 1 may include a housing 20. The housing 20 may include a front face 1A, a back face 1B, and side faces 1C1 to 1C4. The front face 1A is a front face of the housing 20. The back face 1B is a back face of the housing 20. The side faces 1C1 to 1C4 are side faces which connect the front face 1A and the back face 1B. In the following description, the side faces 1C1 to 1C4 may be generally referred to as a side face 1C without identifying which one of faces.

The smartphone 1 may include a touchscreen display 2, buttons 3A to 3C, an illuminance sensor 4, a proximity sensor 5, a receiver 7, a microphone 8, and a camera 12, in the front face 1A. The smartphone 1 may include a camera 13 in the back face 1B. The smartphone 1 may include buttons 3D to 3F and an external interface 14 in the side face 1C. In the following description, the buttons 3A to 3F may be generally referred to as a button 3 without identifying which one of buttons.

The touchscreen display 2 may include a display 2A and a touch screen 2B. The display 2A may include display devices such as a liquid crystal display, an organic EL (electroluminescence) panel, or an inorganic EL panel. The display 2A can display characters, images, symbols, graphics, etc.

The touch screen 2B can detect a touch to the touchscreen display 2 by a finger, a stylus pen, or the like. The touch screen 2B can detect a position where a plurality of fingers, a stylus pen or the like touch the touchscreen display 2.

The detection method for the touch screen 2B may be an arbitrary method such as a capacitive sensing method, a resistive film method, a surface acoustic wave method (or an ultrasonic sensing method), an infrared ray method, an electromagnetic induction method, and a load detection method. In order to simplify the following description, the finger, stylus pen or the like may be simply referred to as "finger", of which touch to the touchscreen display 2 is detected by the touch screen 2B.

The smartphone 1 distinguishes types of gestures based on a touch, a touched position, a touch period of time, or the number of touch operations, which are detected by the touch screen 2B. A gesture is an operation performed for the touchscreen display 2. Gestures distinguished by the smartphone 1 may include a touch, a long touch, a release, a swipe, a tap, a double tap, a long tap, a drag, a flick, a pinch-in, a pinch-out, etc.

A touch is a gesture of a finger to touch the touchscreen display 2 (for example, to a surface thereof). The smartphone 1 distinguishes the gesture of a finger to touch the touchscreen display 2 as a touch. A long touch is a gesture of a finger to touch the touchscreen display 2 for at least a certain period of time. The smartphone 1 distinguishes the gesture of a finger to touch the touchscreen display 2 for at least a certain period of time as a long touch.

A release is a gesture of a finger to separate from the touchscreen display 2. The smartphone 1 distinguishes the gesture of a finger to separate from the touchscreen display 2 as a release. A swipe is a gesture of a finger to move on while touching the touchscreen display 2. The smartphone 1 distinguishes the gesture of a finger to move on while touching the touchscreen display 2 as a swipe.

A tap is a consecutive gesture of touch and release. The smartphone 1 distinguishes the consecutive gesture of touch and release as a tap. A double tap is a gesture of repeating a consecutive gesture of touch and release two times. The smartphone 1 distinguishes the gesture of repeating a consecutive gesture of touch and release two times as a double tap.

A long tap is a consecutive gesture of a long touch and release. The smartphone 1 distinguishes the consecutive gesture of a long touch and release as a long tap. A drag is a gesture of swiping from a starting point where a movable object is displayed. The smartphone 1 distinguishes the gesture of swiping from a starting point where a movable object is displayed, as a drag.

A flick is a consecutive gesture of touch and release of a finger while moving at high speed in one direction. The smartphone 1 distinguishes the gesture of touch and release of a finger while moving at high speed in one direction as a flick. The flick includes: an upward flick of a finger moving in an upward direction on the screen; a downward flick of a finger moving in a downward direction on the screen; a rightward flick of a finger moving in a rightward direction on the screen; a leftward flick of a finger moving in a leftward direction on the screen; etc.

A pinch-in is a gesture of a plurality of fingers swiping in mutually approaching directions. The smartphone 1 distinguishes the gesture of a plurality of fingers swiping in mutually approaching directions as a pinch-in. A pinch-out is a gesture of a plurality of fingers swiping in mutually separating directions. The smartphone 1 distinguishes the gesture of a plurality of fingers swiping in mutually separating directions as a pinch-out.

The smartphone 1 may be operated in accordance with these gestures that are distinguished via the touch screen 2B. Therefore, operability may be intuitive and easy-to-use for a user. An operation performed by the smartphone 1 in accordance with a distinguished gesture differs depending on a displayed screen displayed on the touchscreen display 2.

Figure 4:
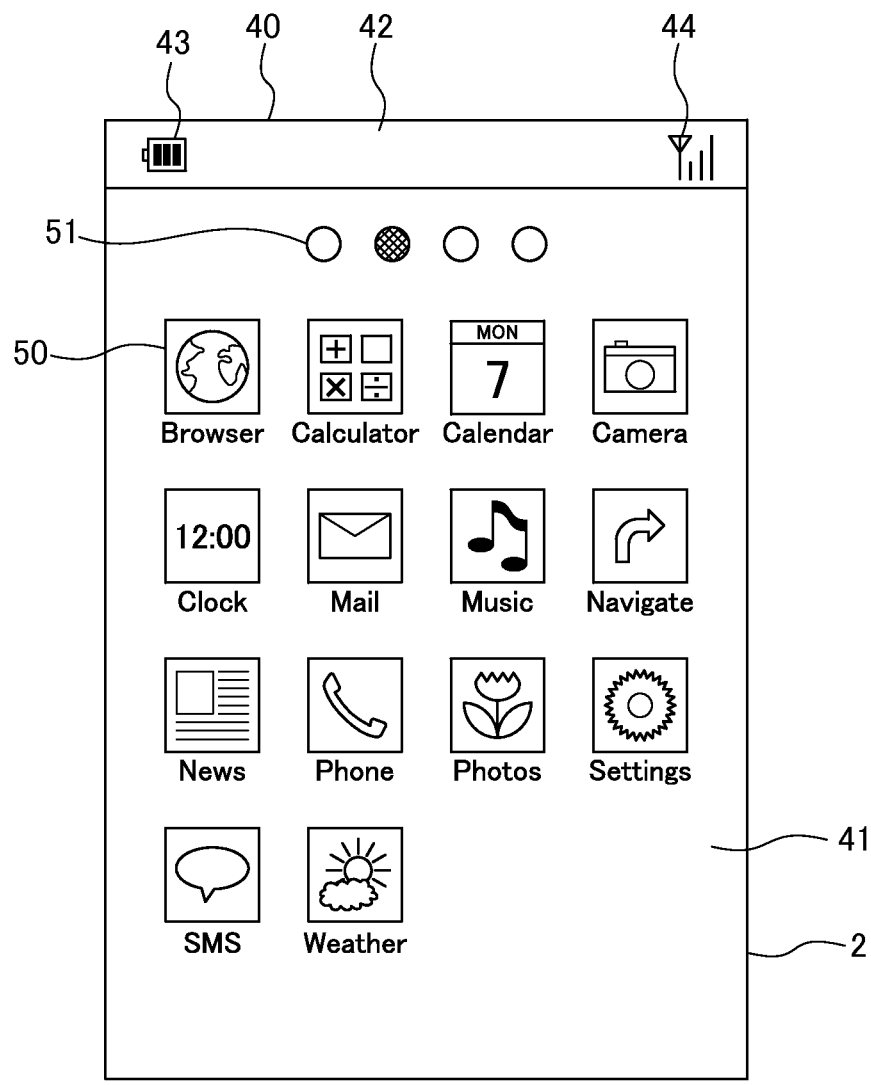
FIG. 4 is a diagram showing an example of a home screen of the smartphone according to the first embodiment.

An example of a screen displayed on the display 2A is described with reference to FIG. 4. FIG. 4 shows an example of a home screen. The home screen may be called a desktop or an idle screen. The display 2A can display the home screen. The home screen may be a screen for allowing the user to select which application is to be executed among applications installed in the smartphone 1. When an application is selected in the home screen, the smartphone 1 can execute the application in the foreground. The display 2A can display a screen of a selected application executed in the foreground.

The smartphone 1 can arrange icons in the home screen. Shown in FIG. 4, a plurality of icons 50 are arranged in a home screen 40. Each icon 50 is associated with one of the applications, which is installed in the smartphone 1. When the smartphone 1 detects a gesture onto an icon 50, an application associated with the icon 50 is executed. For example, when the smartphone 1 detects a tap onto an icon 50 associated with a mail application, the mail application is executed. Here, for example, the smartphone 1 interprets the gesture onto a position (or an area), which corresponds to a displayed position (or a displayed area) of the icon 50 on the touchscreen display 2, as an instruction to execute an application associated with the icon 50.

The icon 50 includes an image and a character string. The icon 50 may include a symbol or graphics in place of the image. The icon 50 need not include one of either the image or the character string. The icons 50 are arranged in accordance with a certain rule. Wall paper 41 is displayed behind the icons 50. The wall paper may also be called a photo screen or a back screen. The smartphone 1 can use an arbitrary image as the wall paper 41. An arbitrary image is determined as the wall paper 41, for example, in accordance with the setting by the user.

The smartphone 1 can increase and decrease the number of home screens. The smartphone 1 determines the number of home screens, for example, in accordance with the setting by the user. Even in a case in which a plurality of home screens are provided, the smartphone 1 selects a single home screen from the plurality of home screens, and displays the single home screen on the display 2A.

The smartphone 1 can display one or more locators on the home screen. The number of the locators coincides with the number of the home screens. The locator indicates the position of the currently displayed home screen. The locator corresponding to the currently displayed home screen is displayed in a manner different from the other locators.

Four locators 51 are displayed in an example shown in FIG. 4. This indicates that there are four home screens 40. In an example shown in FIG. 4, the second symbol (locator) from the left is displayed in a manner different from the other symbols (locators). This indicates that the second home screen from the left is currently displayed.

When the smartphone 1 detects a particular gesture while displaying the home screen, the home screen displayed on the display 2A is switched. For example, when the smartphone 1 detects a rightward flick, the home screen displayed on the display 2A is switched over to the next home screen to the left. When the smartphone 1 detects a leftward flick, the home screen displayed on the display 2A is switched over to the next home screen to the right.

An area 42 is provided at the top edge of the display 2A. A remaining-level mark 43 indicating the remaining level of the rechargeable battery, and a radio wave level mark 44 indicating field intensity of radio waves for communication are displayed in the area 42. In the area 42, the smartphone 1 may display current time, weather information, active applications, type of communication standard, telephone status, device mode, events that occurred in the device, etc. In this way, the area 42 is used for making various notifications to the user. The area 42 may be provided as another screen separate from the home screen 40. The position at which the area 42 is provided is not limited to the top edge of the display 2A.

The home screen 40 shown in FIG. 4 is an example, and shapes of various elements, layouts of various elements, the number of home screens 40, and the manner of various operations on the home screen 40 need not be as described in the above descriptions.

Figure 5:
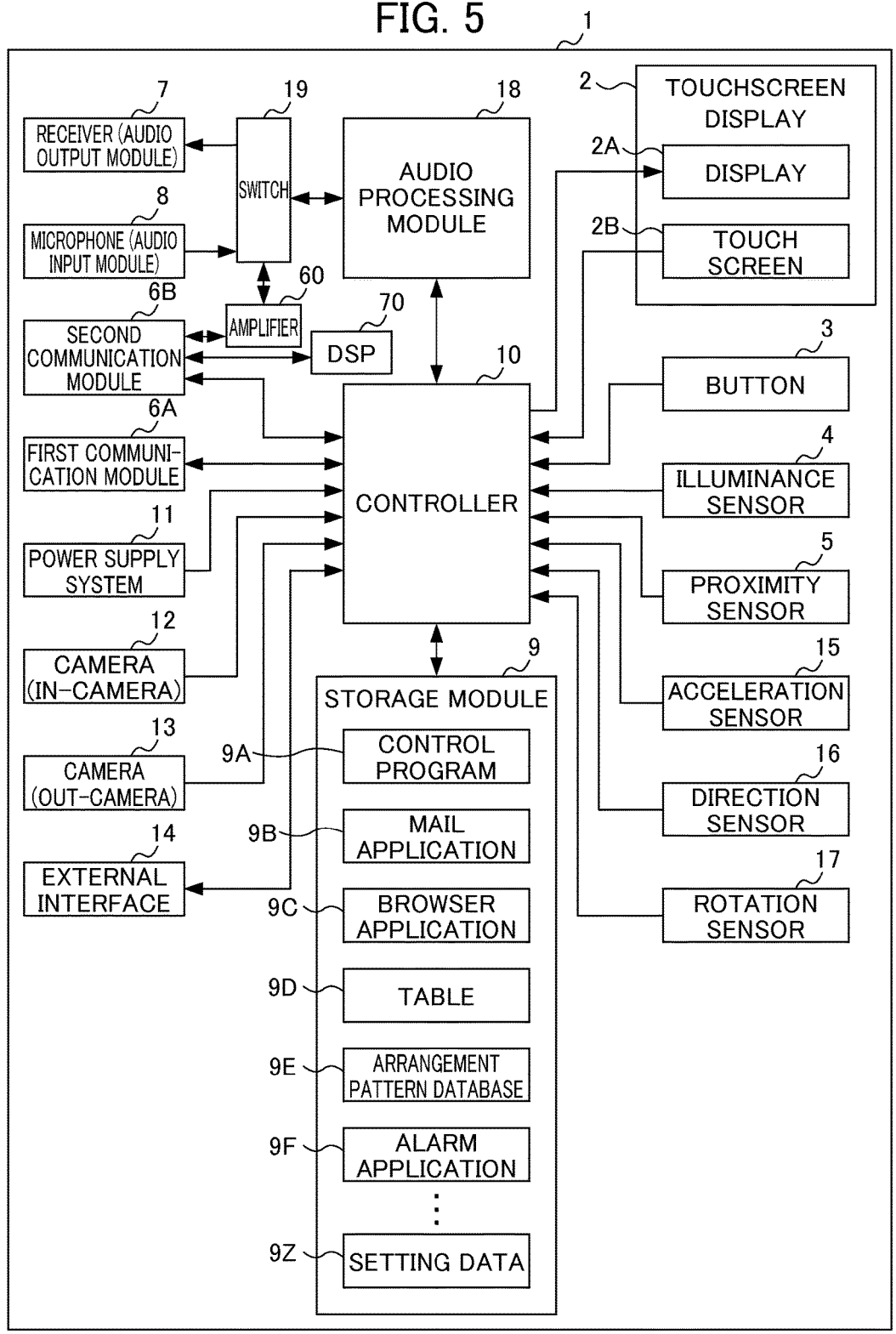
FIG. 5 is a block diagram showing functions of the smartphone according to the first embodiment.

FIG. 5 is a block diagram showing a configuration of the smartphone 1. The smartphone 1 may include the touchscreen display 2, the button 3, the illuminance sensor 4, the proximity sensor 5, a first communication module 6A, a second communication module 6B, the receiver 7, the microphone 8, a storage module 9, a controller 10 as a first control module, the cameras 12 and 13, the external interface 14, an acceleration sensor 15, a direction sensor 16, a rotation sensor 17, an audio processing module 18, a first switch 19 as a first switching module, an amplifier 60, and a DSP (Digital Signal Processor) 70

As described above, the touchscreen display 2 has the display 2A and the touch screen 2B. The display 2A can display characters, images, symbols, graphics, etc. The touch screen 2B can detect a touch of gesture.

The button 3 is operated by the user. The button 3 has the buttons 3A to 3F. The controller 10 collaborates with the button 3 to detect an operation of the button. Operations of the button are, for example, a click, a double click, a push, and a multi-push.

For example, the buttons 3A to 3C are a home button, a back button or a menu button. For example, the button 3D is a power on/off button of the smartphone 1. The button 3D may also serve as a sleep/wake-up button. For example, the buttons 3E and 3F are volume buttons.

The illuminance sensor 4 can detect illuminance. For example, the illuminance includes intensity, brightness, brilliance, etc. of light. For example, the illuminance sensor 4 is used for adjusting the brilliance of the display 2A.

The proximity sensor 5 can detect presence of a proximate object in a contactless manner. The proximity sensor 5 detects, for example, a face being brought close to the touchscreen display 2.

The first communication module 6A and the second communication module 6B perform wireless communication.

A first communication scheme, which is used by the first communication module 6A, is a wireless communication standard. For example, wireless communication standards of the first communication scheme include cellular phone communication standards such as 3G and 4G. For example, the cellular phone communication standards include LTE (Long Term Evolution), W-CDMA, CDMA2000, etc. In addition, for example, the wireless communication standards of the first communication scheme include WiMAX (Worldwide Interoperability for Microwave Access), IEEE 802.11, Bluetooth, IrDA, NFC (Near Field Communication), etc. The first communication module 6A may support one or more of the communication standards described above.

A second communication scheme, which is used by the second communication module 6B, is a communication scheme different from the first communication scheme, and is a wireless communication standard. For example, wireless communication standards of the second communication scheme include cellular phone communication standards such as 2G. For example, the cellular phone communication standards include PDC, GSM, PHS (Personal Handy-phone System), etc. The second communication module 6B may support one or more of the communication standards described above.

The receiver 7 and the microphone 8 as audio input-output modules are connected to the audio processing module 18 via the first switch 19.

When an analog audio signal is transmitted from the audio processing module 18, the receiver 7 outputs the analog audio signal as audio. The microphone 8 converts audio such as the user's voice into an analog audio signal, and transmits the converted signal to the audio processing module 18. The audio processing module 18 executes certain audio processing under the control of the controller 10, and outputs the processed signal to the receiver 7. More specifically, the audio processing module 18 converts a digital audio signal of a linear PCM scheme into an analog audio signal, and outputs the analog audio signal to the receiver 7. When an analog audio signal is input from the microphone 8, the audio processing module 18 converts the analog audio signal into a digital audio signal of the linear PCM scheme, and outputs this converted signal to the controller 10.

Furthermore, the receiver 7 and the microphone 8 are connected to the second communication module 6B via the first switch 19 and the amplifier 60.

When an analog audio signal is transmitted from the second communication module 6B, the receiver 7 outputs the analog audio signal as audio. The microphone 8 converts audio such as the user's voice into an analog audio signal, and transmits the converted signal to the second communication module 6B. The amplifier 60 amplifies an audio signal under the control of the second communication module 6B, and outputs the processed signal to the receiver 7. When a signal is input from the microphone 8, the amplifier 60 amplifies the signal, and outputs the processed signal to the second communication module 6B.

The smartphone 1 may further include a speaker(s) in addition to the receiver 7. The smartphone 1 may further include a speaker(s) in place of the receiver 7.

The storage module 9 can store programs and data. The storage module 9 may perform as a working area for temporarily storing processing results of the controller 10. The storage module 9 may include an arbitrary storage device such as a semiconductor storage device and a magnetic storage device. The storage module 9 may include several types of storage devices. The storage module 9 may include a combination of a portable storage medium such as a memory card with a reader for the storage medium.

The programs stored in the storage module 9 may include: applications that are executed in the foreground or the background; and a control program that assists operations of the applications. For example, an application causes the display 2A to display a certain screen, and causes the controller 10 to execute processing in accordance with a gesture detected by the touch screen 2B. The control program is, for example, an OS. The applications and the control program may be installed in the storage module 9 via wireless communication by the first communication module 6A or the second communication module 6B, or via a storage medium.

The storage module 9 can store, for example, a control program 9A, a mail application 9B, a browser application 9C, setting data 9Z, etc. The mail application 9B provides electronic mail functions for creating, transmitting, receiving, displaying, etc. of electronic mail. The browser application 9C provides a web browsing function for displaying web pages. A table 9D includes various tables such as a key assignment table. An arrangement pattern database 9E stores arrangement patterns such as those of icons displayed on the display 2A. The setting data 9Z provides various set-up functions for operations of the smartphone 1. For example, the setting data 9Z stores a first parameter and a second parameter for adjusting the audio quality of the audio signal. Here, the first parameter and the second parameter each include parameters for performing volume level adjustment, frequency characteristics alteration, automatic gain control, echo cancellation, and noise suppression. Note that each of a plurality of states of telephone calls, such as an ordinary telephone call, a headset telephone call, etc., may respectively include these parameters. Each individual state such as a state when recording, a state when replaying a recorded message, and a state when outputting audio such as a key operation audio may respectively include these parameters.

The control program 9A provides functions regarding a variety of control for operating the smartphone 1. The control program 9A implements, for example, a telephone call function by controlling the first communication module 6A, the second communication module 6B, the receiver 7, the microphone 8, etc. The functions provided by the control program 9A include functions of executing a variety of control such as changing the information displayed on the display 2A in accordance with a gesture detected via the touch screen 2B. The functions provided by the control program 9A may be utilized in combination with functions provided by other programs such as the mail application 9B.

The controller 10 is, for example, a CPU (Central Processing Unit). The controller 10 may be an integrated circuit such as a SoC (System-on-a-chip) that integrates other constituent elements such as the first communication module 6A. The controller 10 can comprehensively control the operations of the smartphone 1 to implement various functions.

More specifically, the controller 10 can implement various functions by referring to data stored in the storage module 9 as necessary, executing instructions included in a program stored in the storage module 9, and controlling the display 2A, the first communication module 6A, the second communication module 6B, etc. The controller 10 may change the control in accordance with a result of detection by various detecting modules such as the touch screen 2B, the button 3 and the acceleration sensor 15.

For example, the controller 10 can execute the control program 9A. The controller 10 can execute a variety of control. The variety of control may include changing the information displayed on the display 2A in accordance with a gesture detected via the touch screen 2B.

In an embodiment, the camera 12 may be an in-camera that photographs an object facing the front face 1A. In an embodiment, the camera 13 may be an out-camera that photographs an object facing the back face 1B.

The external interface 14 is a terminal to which another device is connected. The external interface 14 may be a universal terminal such as USB (Universal Serial Bus), HDMI (High-Definition Multimedia Interface), Light Peak (which may be called Thunderbolt), or an earpiece-microphone connector. The external interface 14 may be a terminal designed for exclusive use, such as a Dock connector. A device that is connected to the external interface 14 includes, for example, an external storage module, a speaker, or a communication device.

The acceleration sensor 15 can detect direction and level of acceleration that acts on the smartphone 1. The direction sensor 16 can detect geomagnetic orientation. The rotation sensor 17 can detect rotation of the smartphone 1. Results of such detection by the acceleration sensor 15, the direction sensor 16 and the rotation sensor 17 are utilized in combination to detect change in the position and posture of the smartphone 1.

The first switch 19 switches between: a first mode for transmitting an analog audio signal between the audio processing module 18 and the audio input-output module (the receiver 7 or the microphone 8); and a second mode for transmitting an analog audio signal between the second communication module 6B and the audio input-output module.

A DSP 70 as a signal processing module receives a digital audio signal from the second communication module 6B, executes audio quality improvement processing on the signal, and provides the processed signal to the second communication module 6B. The audio quality improvement processing includes, for example, processing such as frequency correction and noise removal.

The smartphone 1 as thus constituted can implement a telephone call by using the respective communication modules of the plurality of communication schemes conforming to voice calls. A specific configuration is described below.

Figure 6:
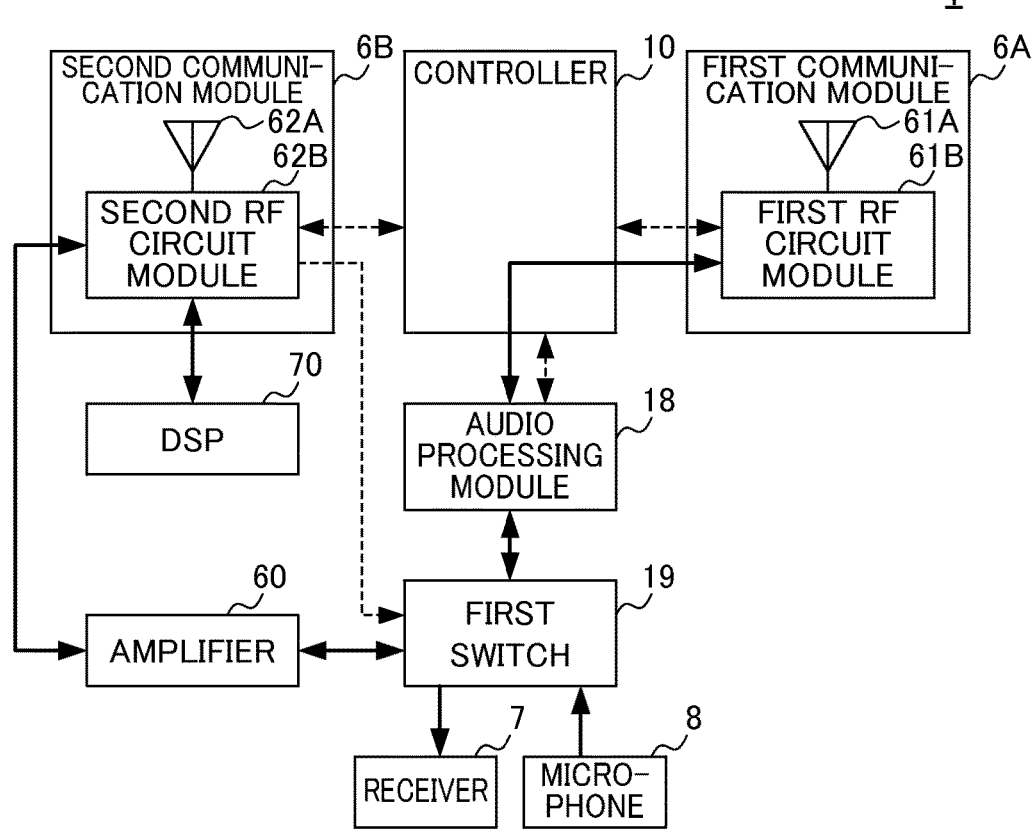
FIG. 6 is a block diagram showing detailed functions of the smartphone according to the first embodiment.

FIG. 6 is a block diagram showing detailed functions of the smartphone 1.

Note that, in the drawing, solid arrows show transmission paths for digital audio signals or analog audio signals in relation to audio communication; and broken arrows show transmission paths for control signals.

The first communication module 6A includes: a first antenna 61A as a first communication module; and a first RF circuit module 61B as a first communication processing module.

The first antenna 61A performs wireless communication with an external device such as a base station, in accordance with the first communication scheme described above. More specifically, the first antenna 61A transmits and receives a high-frequency signal with an external device such as a base station, the signal being modulated by the first RF circuit module 61B. For example, the high-frequency signal includes audio signals for a telephone call.

The first RF circuit module 61B processes a high-frequency signal transmitted and received by the first antenna 61A. More specifically, when a signal is received by the first antenna 61A, the first RF circuit module 61B demodulates the signal in accordance with a certain demodulation method, and supplies the demodulated signal to the controller 10. When a signal is supplied from the controller 10, the first RF circuit module 61B modulates the signal in accordance with a certain modulation method, and supplies the modulated signal to the first antenna 61A.

For example, the first RF circuit module 61B demodulates (or converts) an audio signal received by the first antenna 61A, thereby obtaining a digital audio signal of the linear PCM scheme. The first RF circuit module 61B supplies a digital audio signal of this linear PCM scheme to the controller 10. When a digital audio signal of the linear PCM scheme is supplied from the controller 10, the first RF circuit module 61B modulates the signal, and supplies the signal to the first antenna 61A.

The second communication module 6B includes: a second antenna 62A as a second communication module; and a second RF circuit module 62B as a second communication processing module.

The second antenna 62A performs wireless communication with an external device such as a base station, in accordance with the second communication scheme described above. More specifically, the second antenna 62A transmits and receives a high-frequency signal to and from an external device such as a base station, the signal being modulated by the second RF circuit module 62B. For example, the high-frequency signal includes audio signals for a telephone call.

The second RF circuit module 62B processes a high-frequency signal transmitted and received by the second antenna 62A. More specifically, when a signal is received by the second antenna 62A, the second RF circuit module 62B demodulates the signal in accordance with a certain demodulation method, and supplies the demodulated signal to the receiver 7 via the amplifier 60 and the first switch 19. When a signal is supplied from the microphone 8 via the first switch 19 and the amplifier 60, the second RF circuit module 62B modulates the signal in accordance with a certain modulation method, and supplies the modulated signal to the second antenna 62A.

For example, the second RF circuit module 62B demodulates (or converts) an audio signal received by the second antenna 62A, thereby obtaining a digital audio signal of a μ-law PCM scheme. The second RF circuit module 62B converts a digital audio signal of the μ-law PCM scheme into an analog audio signal, and outputs the analog audio signal by executing processing such as volume control. When an analog audio signal is supplied, the second RF circuit module 62B converts the signal into a digital signal, modulates the signal, and supplies the signal to the second antenna 62A.

Prior to converting a digital audio signal into an analog audio signal, the second RF circuit module 62B performs audio quality improvement such as frequency correction and noise removal by way of the DSP 70.

The controller 10 controls output of a digital audio signal, which is input from the first RF circuit module 61B, to the audio processing module 18; and output of a digital audio signal, which is input from the audio processing module 18, to the first RF circuit module 61B.

More specifically, in a case in which communication is being performed by the first communication module 6A, when a digital audio signal is supplied from the first RF circuit module 61B, the controller 10 supplies this digital audio signal to the audio processing module 18. In a case in which communication is being performed by the first communication module 6A, when a digital audio signal is input from the audio processing module 18, the controller 10 supplies this digital audio signal to the first RF circuit module 61B.

The audio processing module 18 converts (or decodes) a digital audio signal into an analog audio signal, and outputs the analog audio signal to the receiver 7 via the first switch 19.

The first switch 19 switches a transmission path of an audio signal, under the control of the second RF circuit module 62B. In a case in which a voice call is performed by the first communication module 6A, the first switch 19 establishes a transmission path between the audio processing module 18 and the receiver 7, and a transmission path between the audio processing module 18 and the microphone 8, thereby enabling a voice call in the first mode. In a case in which the second communication module 6B performs a voice call, the first switch 19 establishes a transmission path between the amplifier 60 and the receiver 7, and a transmission path between the amplifier 60 and the microphone 8, thereby enabling a voice call in the second mode.

Therefore, the smartphone 1 can implement a telephone call by using the plurality of respective communication modules conforming to voice calls.

In a case in which the initial state of the first switch 19 is the first mode, the second RF circuit module 62B controls the first switch 19 to switch from the first mode to the second mode when performing audio communication by the second RF circuit module 62B, and to switch from the second mode to the first mode when terminating the audio communication by the second RF circuit module 62B.

The controller 10 controls incoming and outgoing calls in the first RF circuit module 61B and the second RF circuit module 62B. In response to a request to start or terminate an incoming or outgoing voice call in accordance with the second communication scheme, the controller 10 instructs the second RF circuit module 62B to switch the mode of the first switch 19.

More specifically, for example, when a request for audio communication by the second RF circuit module 62B is generated, in a case in which audio communication is not being performed by the first RF circuit module 61B, the controller 10 instructs the second RF circuit module 62B to switch to the second mode.

In a case in which audio communication is being performed by the first RF circuit module 61B, the controller 10 suspends the audio communication by the first RF circuit module 61B, and instructs the second RF circuit module 62B to switch to the second mode. At this time, the controller 10 may instruct switching to the second mode, in response to an instruction input through a user operation.

Here, a request for a voice call by the second RF circuit module 62B refers to, for example, a response through a user operation in relation to an incoming call notice which is received from the second RF circuit module 62B, or a request for an outgoing call for the second RF circuit module 62B through a user operation.

As described above, according to the present embodiment, the smartphone 1 switches transmission path of an analog audio signal between the first mode and the second mode by way of the first switch 19. Therefore, the smartphone 1 can implement a telephone call by using the respective communication modules of the plurality of communication schemes conforming to voice calls.

According to the present embodiment, an analog audio signal is output from the second communication module 6B; therefore, there is no need to provide a processing module for converting a digital audio signal into an analog audio signal between the second communication module 6B and the receiver 7; and the hardware configuration can be simplified as compared to a case of providing a processing module.

The smartphone 1 can be equipped with a voice call function in accordance with the second communication scheme, without modifying the first communication module 6A, the controller 10 and the audio processing module 18, which are the functional modules for a voice call in accordance with the first communication scheme.

Furthermore, the existing second communication module 6B having a function of converting into an analog audio signal can be used as a functional module for a voice call in accordance with the second communication scheme, and can therefore be easily implemented without providing another control module exclusively for the second communication scheme. The receiver 7 and the microphone 8 are shared by the two communication schemes; therefore, the number of parts and the device size can be reduced.

The second RF circuit module 62B controls the first switch 19; therefore, the smartphone 1 can appropriately switch the mode in response to start or termination of a voice call in accordance with the second communication scheme.

Furthermore, the smartphone 1 instructs the second RF circuit module 62B to switch the mode, under the control of the controller 10; therefore, the smartphone 1 can appropriately switch the mode, based on the status of a voice call in accordance with the first communication scheme, and through a user operation, etc.

The smartphone 1 executes audio quality improvement processing by way of the DSP 70; therefore, the smartphone 1 can reduce the processing load on the second RF circuit module 62B, while improving the telephone call quality.

Second Embodiment

A second embodiment of the present disclosure is described with reference to the drawings.

Note that configurations similar to those of the first embodiment are assigned with identical reference numerals, and descriptions thereof are omitted or simplified.

Figure 7:
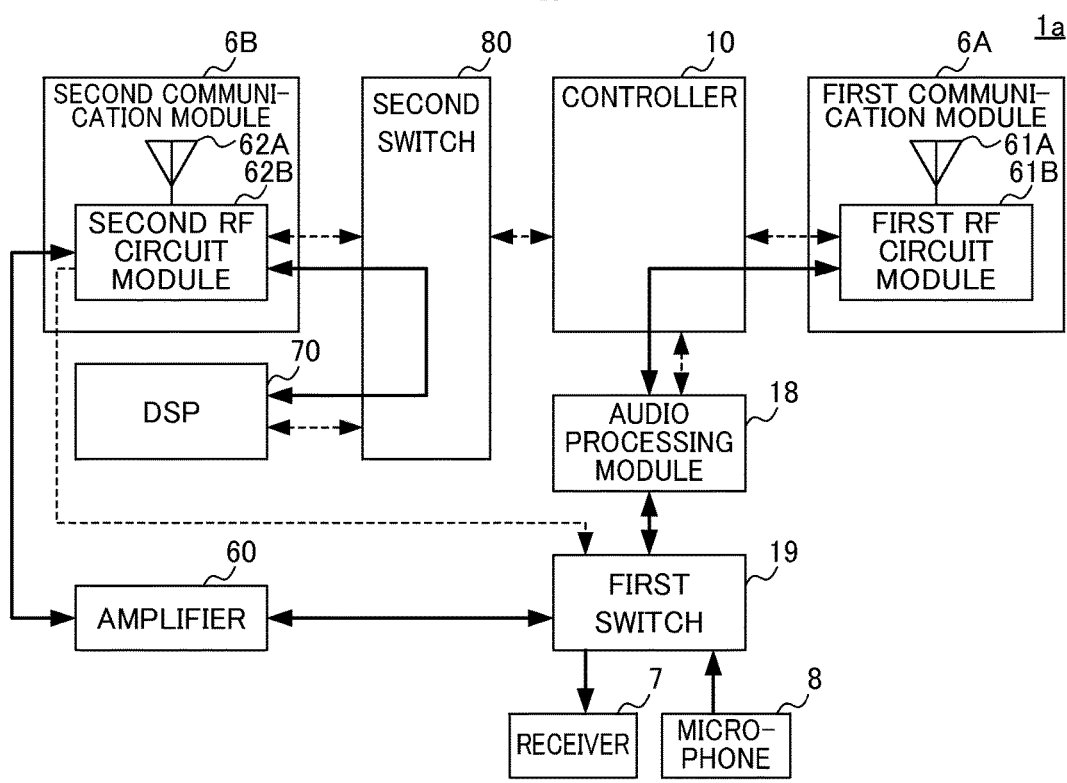
FIG. 7 is a block diagram showing detailed functions of a smartphone according to a second embodiment.

FIG. 7 is a block diagram showing detailed functions of a smartphone 1a according to the present embodiment.

In addition to the first switch 19, the smartphone 1a includes a second switch 80 as a second control module and a second switching module. Communication for call control between the second communication module 6B and the controller 10 is performed via the second switch 80.

The second switch 80 controls the DSP 70; when the second switch 80 receives a digital audio signal from the second RF circuit module 62B, the second switch 80 performs audio quality improvement by way of the DSP 70, and subsequently supplies the processed signal to the second RF circuit module 62B.

The second switch 80 turns on the DSP 70 only when a voice call is being made by the second communication module 6B, and audio quality improvement processing is executed. In other cases such as, for example, when a voice call is made by the first communication module 6A, or when a voice call is made by the second communication module 6B but audio quality improvement processing is not executed, the second switch 80 turns off the DSP 70, thereby making it possible to reduce electric power consumption of the DSP 70.

Third Embodiment

A third embodiment of the present disclosure is described with reference to the drawings.

Note that configurations similar to those of the second embodiment are assigned with identical reference numerals, and descriptions thereof are omitted or simplified.

Figure 8:
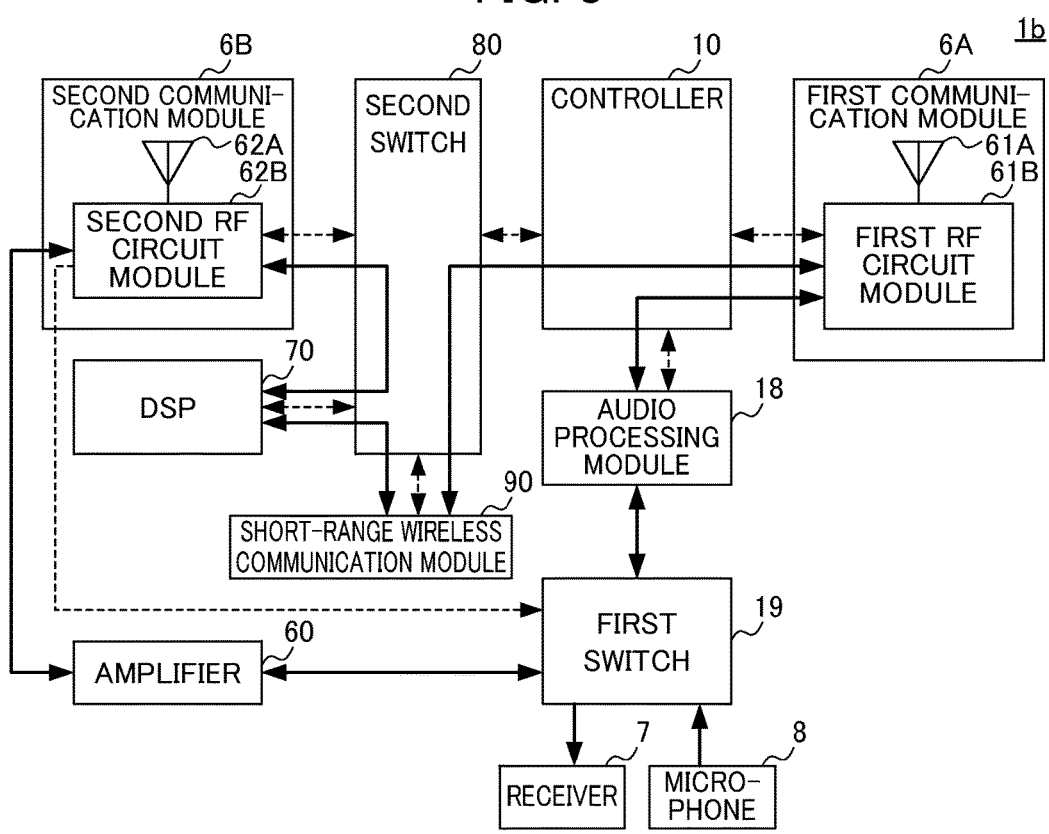
FIG. 8 is a block diagram showing detailed functions of a smartphone according to a third embodiment.

FIG. 8 is a block diagram showing detailed functions of a smartphone 1b according to the present embodiment.

In addition to the configurations of the second embodiment, the smartphone 1b includes a short-range wireless communication module 90. The short-range wireless communication module 90 is controlled by the second switch 80, and communicates with, for example, a headset as an I/O device for audio signals through Bluetooth. This enables a hands-free telephone call.

When performing a hands-free telephone call, in a case in which audio communication is performed by the first communication module 6A, the second switch 80 transmits a digital audio signal between the first communication module 6A and the short-range wireless communication module 90. On the other hand, in a case in which audio communication is performed by the second communication module 6B, the second switch 80 transmits a digital audio signal between the second communication module 6B and the short-range wireless communication module 90.

In this manner, the second switch 80 switches transmission path of an audio signal; as a result, the smartphone 1b can implement a hands-free telephone call by using the respective communication modules of the plurality of communication schemes.

Characteristic embodiments have been described above to completely and clearly disclose the present disclosure. However, the invention according to the attached claims should not be limited to the above embodiments, and should be configured to embody all modification examples and substitutable configurations, which a person skilled in the art can create within basic matters disclosed herein.

In the above embodiments, the DSP 70 executes audio quality improvement processing; however, the second RF circuit module 62B itself may execute audio quality improvement processing on an audio signal, which is input from the second antenna 62A. According to this configuration, the DSP 70 may become unnecessary, and the number of parts may be reduced, depending on the processing capability of the second RF circuit module 62B.

In the above embodiments, the second RF circuit module 62B controls the first switch 19; however, the controller 10 may control the first switch 19.

In the above embodiments, the controller 10 may turn on the audio processing module 18 when the first switch 19 enables a voice call in the first mode; and the controller 10 may turn off the audio processing module 18 when the first switch 19 enables a voice call in the second mode. As a result, the smartphone 1 turns off the audio processing module 18 when the audio processing module 18 is not used, thereby making it possible to reduce electric power consumption.

Each of the programs shown in FIG. 5 may be divided into a plurality of modules, and may be combined with other programs.

Some or all of the programs stored in the storage 9 as described in FIG. 5 may be downloaded from other devices via wireless communication by the first communication module 6A or the second communication module 6B. Some or all of the programs stored in the storage 9 as described in FIG. 5 may be stored in a storage medium that is readable by a reader included in the storage 9. Some or all of the programs stored in the storage 9 as described in FIG. 5 may be stored in a storage medium such as a CD, a DVD or a Blu-ray that is readable by a reader connected to the external interface 14.

In the above embodiments, a smartphone has been described as an example of the wireless terminal device, but the wireless terminal device is not limited to a smartphone. For example, the wireless terminal device may be a portable electronic device such as a mobile phone, a portable personal computer, a digital camera, a media player, a digital book reader, a navigator or a gaming machine. The wireless terminal devices may be a non-portable electronic device such as a desktop PC or a television set.

The invention claimed is:

1. A wireless terminal device, comprising:
  a first processor configured to perform wireless communication by a first communication system;
  a second processor configured to perform wireless communication by a second communication system;
  a third processor configured to convert a digital audio signal into an analog audio signal;
  a receiver configured to output an analog audio signal as an audio to outside; and
  a switch configured to switch between a first mode and a second mode,
  wherein
    the first processor is further configured to transmit the digital audio signal, based on a signal received from a network by the first communication system, to the third processor,
    the third processor is further configured to transmit an analog audio signal, converted from the digital audio signal, to the receiver,
    the second processor is further configured to
      convert a digital audio signal into an analog audio signal, and
      transmit the analog audio signal, based on a signal from a network by the second communication system, not through the third processor, to the receiver,
    in the first mode, the receiver is configured to receive the analog audio signal from the third processor,
    in the second mode, the receiver is configured to receive the analog audio signal from the second processor, and
    the second processor is configured to cause the switch to switch to the second mode when audio communication is performed by the second processor, and to switch from the second mode to the first mode when audio communication by the second processor is terminated.

2. The wireless terminal device according to claim 1, further comprising a first controller configured to control incoming and outgoing voice calls in the first processor and the second processor;

wherein the first controller is configured to cause the second processor to switch the switch, in response to a request to start or terminate an incoming or outgoing voice call.

3. The wireless terminal device according to claim 2, wherein, when a request for audio communication by the second processor is generated and audio communication is not being performed by the first processor, the first controller is configured to switch the switch to the second mode.

4. The wireless terminal device according to claim 2, wherein, when a request for audio communication by the second processor is generated and audio communication is being performed by the first processor, the first controller is configured to suspend the audio communication by the first processor, and to switch the switch from the first mode to the second mode.

5. The wireless terminal device according to claim 2, wherein, when a request for audio communication by the second processor is generated, the first controller is configured to switch the switch to the second mode.

6. The wireless terminal device according to claim 1, further comprising:
a short-range wireless processor configured to perform wireless communication with an input/output (I/O) device for inputting and outputting an audio signal, wherein,
when audio communication is performed by the first processor, the first processor is configured to transmit a digital audio signal to the short-range wireless processor; and
when audio communication is performed by the second processor, the second processor is configured to transmit a digital audio signal to the short-range wireless processor.

7. The wireless terminal device according to claim 1, wherein
the switch is positioned on a path between the third processor and the receiver and configured to be controlled by the second processor, and
the second processor is configured to transmit the analog audio signal, based on the signal from the network by the second communication system, not through the third processor but through the switch, to the receiver.

8. A wireless terminal device, comprising:
a first processor configured to perform wireless communication by a first communication system;
a second processor configured to perform wireless communication by a second communication system;
a third processor configured to convert an analog audio signal into a digital audio signal;
a microphone configured to transmit an analog audio signal based on an audio received from outside to the third processor; and
a switch configured to switch between a first mode and a second mode,
wherein
the first processor is further configured to receive the digital audio signal from the third processor,
the second processor is further configured to
receive an analog audio signal, not through the third processor, from the microphone,
convert the analog audio signal into a digital audio signal, and
transmit the digital audio signal to the second communication system,
in the first mode, a receiver is configured to receive the analog audio signal from the third processor,
in the second mode, the receiver is configured to receive the analog audio signal from the second processor, and
the second processor is configured to cause the switch to switch to the second mode when audio communication is performed by the second processor, and to switch from the second mode to the first mode when audio communication by the second processor is terminated.

9. The wireless terminal device according to claim 8, wherein
the switch is positioned on a path between the third processor and the microphone and configured to be controlled by the second processor, and
the second processor is configured to receive the analog audio signal, not through the third processor but through the switch, from the microphone.

10. A wireless terminal device, comprising:
a first processor configured to perform wireless communication by a first communication system;
a second processor configured to perform wireless communication by a second communication system;
a third processor configured to convert a digital audio signal into an analog audio signal;
a receiver configured to output an analog audio signal as an audio to outside; and
a switch configured to switch between a first mode and a second mode,
wherein
the first processor is further configured to transmit the digital audio signal, based on a signal received from a network by the first communication system, to the third processor, and
the second processor is further configured to
convert a digital audio signal into an analog audio signal, and
transmit the analog audio signal, based on a signal from a network by the second communication system, not through the third processor, to the receiver,
in the first mode, the receiver is configured to receive the analog audio signal from the third processor,
in the second mode, the receiver is configured to receive the analog audio signal from the second processor, and
the second processor is configured to cause the switch to switch to the second mode when audio communication is performed by the second processor, and to switch from the second mode to the first mode when audio communication by the second processor is terminated.

11. The wireless terminal device according to claim 10, wherein
the switch is positioned on a path between the third processor and the receiver and configured to be controlled by the second processor, and
the second processor is configured to transmit the analog audio signal, based on the signal from the network by the second communication system, not through the third processor but through the switch, to the receiver.

* * * * *